United States Patent [19]

Green

[11] Patent Number: 4,709,238

[45] Date of Patent: Nov. 24, 1987

[54] SEQUENTIAL MONO-LOBE TRACKER

[75] Inventor: Norman Green, Phoenix, Md.

[73] Assignee: Allied Corporation, Morristown, N.J.

[21] Appl. No.: 604,678

[22] Filed: Apr. 27, 1984

[51] Int. Cl.$^4$ .............................................. G01S 3/44
[52] U.S. Cl. .................................... 342/427; 342/79; 342/155
[58] Field of Search .......................... 343/427, 16 LS; 342/427, 79, 90, 155

[56] References Cited

U.S. PATENT DOCUMENTS

| 3,725,937 | 4/1973 | Schreiber | 343/16 LS X |
| 3,849,779 | 11/1974 | Boyd | 343/16 LS X |
| 3,982,199 | 9/1976 | Green | 331/51 |
| 3,983,562 | 9/1976 | Blanchard | 343/815 |
| 4,041,487 | 8/1977 | Evans et al. | 343/16 LS X |
| 4,430,655 | 2/1984 | Rittenbach | 343/16 LS |

Primary Examiner—Theodore M. Blum
Assistant Examiner—John B. Sotomayor
Attorney, Agent, or Firm—Robert M. Trepp; Bruce L. Lamb

[57] ABSTRACT

A mono-lobe tracker is described for tracking a target emitting radio signals incorporating an antenna, a circuit for sequential lobing, a radio frequency amplifier, a mixer, an intermediate frequency amplifier, an amplitude modulator detector, and integrators for storing the amplitude signals corresponding to predetermined off boresight positions, means for taking the difference of two integrators indicating the boresight error, a motor coupled to the error signal for driving the antenna in response to the error signal and a random number generator for generating at random a plurality of frequencies which are coupled as randomly selected to the sequential lobing circuit. A random number generator is also described incorporating a noise diode, an amplifier, a voltage comparator and a counter.

9 Claims, 4 Drawing Figures

SEQUENTIAL MONO-LOBE TRACKER

GOVERNMENT CONTRACT

The government has rights in this invention pursuant to Contract No. DAAK-20-79-C-1700 awarded by the Department of Army.

BACKGROUND OF THE INVENTION

1. Field of the Invention

This invention relates to apparatus for passively tracking a target emitting radio signals and more particularly to tracking by sequential lobing a target emitting a modulated radio signal by sequential lobing.

2. Description of the Prior Art

One method of obtaining meteorological data is by launching a radiosonde which typically includes a balloon, sensors and a radio transmitter. The radiosonde may be launched from the earth's surface. As the radiosonde ascends, the temperature, relative humidity and atmospheric pressure are transmitted by a radio transmitter. The transmitted signals may have a predetermined format and may be sent by a frequency modulated carrier such as at 1680 MHz.

The radiosonde may be tracked by an antenna on the ground which is sequentially lobed about the target to provide an error signal to position the antenna. The pressure information transmitted by the radiosonde gives an indication of altitude. The tracking angle or position of the target over time provides a means for determining the wind velocity and direction as a function of altitude.

Presently the radiosonde may be tracked with an antenna having four dipoles mounted about the focal point of a parabolic reflector. The microwave signals received by the dipole antennas may be combined to provide an amplitude signal, indicative of the off boresight location of the target emitting radio signals. One example of a mono-lobed scanner or antenna suitable for tracking a radiosonde is described in U.S. Pat. No. 3,983,562 which issued on Sept. 28, 1976 to William C. Blanchard and James E. Kreiner, Jr. and assigned to The Bendix Corporation. FIG. 2 shows a parabolic reflector having four dipole antennas mounted at the focal point for receiving radio signals reflected by the parabolic reflector. FIG. 3 shows a more detailed view of the dipole antennas which further includes a fifth dipole antenna mounted at the boresight of the antenna. The amplitude signals developed for the present error system are derived from the signals arriving at the antenna as the antenna is switched or scanned to provide a sum and difference mono-pulse response at four positions namely, up, right, down, left, to sequentially lobe about the target.

While the tracking of the radiosonde is based on the power of the radio signals received at the antenna, the radio signal is frequency modulated to contain the information or meteorological data which may affect the amplitude of the signal detected in the receiver. A system pointing accuracy of approximately 0.05° corresponds to a 0.1 db antenna signal amplitude variation. Since synchronous detection is used, random signal fluctuations due to noise are averaged out and do not influence the performance.

The tracking system, however, is sensitive to periodic amplitude modulation when it occurs near the antenna sampling rate, typically in the range of 700 Hz to 1700 Hz or at multiples or sub-multiples thereof. The frequency modulated data results in carrier amplitude modulation which may be an order of magnitude greater than the normal tracking error signal, due to the passband of the radio frequency amplifiers in the receiver. This may result in antenna pointing errors, antenna nodding and occasional breaking of tracking lock with the radiosonde target.

Other prior art relating to frequency generation is found in U.S. Pat. No. 3,982,199 which issued on Sept. 21, 1976 to Norman Green, the inventor herein, and assigned to The Bendix Corporation. In U.S. Pat. No. 3,982,199 a digital frequency synthesizer is described incorporating an oscillator and variable frequency divider. The reference frequency from the oscillator is counted down by a variable digital frequency divider whose divisor N is selected by some means such as by switches.

SUMMARY OF THE INVENTION

An apparatus and method is described which uses non-periodic antenna scanning in the course of tracking a radiosonde to reduce the effect of interfering meteorological data signals which are periodic.

Further, an apparatus and method is described for tracking a target emitting radio signals comprising an antenna having a boresight for receiving radio signals, a microwave network for shifting the boresight of the antenna from a first to a second position and back a plurality of times, an amplitude detector for determining the amplitude of the signal received in the first and second positions, a differencing circuit for subtracting the amplitude of the signals in the first and second positions to generate an error signal, and motors for positioning the antenna in response to the error signal, wherein the shifting of the antenna boresight from the first to second positions and back is shifted at a rate determined by a frequency which is randomly selected after a predetermined number of shifts of the antenna boresight.

Further, an apparatus and method is described which changes the scan frequency in a random fashion after each up, right, down and left scan cycle while tracking the target.

Further, an apparatus and method is described which selects one out of a possible 16 frequencies in the range from 854 Hz to 1.61 KHz, wherein the selection is made at random prior to each antenna scan.

The invention further provides an apparatus and method for generating a random number comprising a diode, a current source for passing current through the diode, an amplifier for amplifying the voltage across the diode, a differential amplifier having one terminal coupled to the voltage across the diode and the other terminal coupled to a reference voltage for generating one and zero output levels, and a counter coupled to the output of the differential amplifier, whereby the counter is incremented at a random rate and contains a random number.

DESCRIPTION OF THE PREFERRED EMBODIMENT

Figure 1:
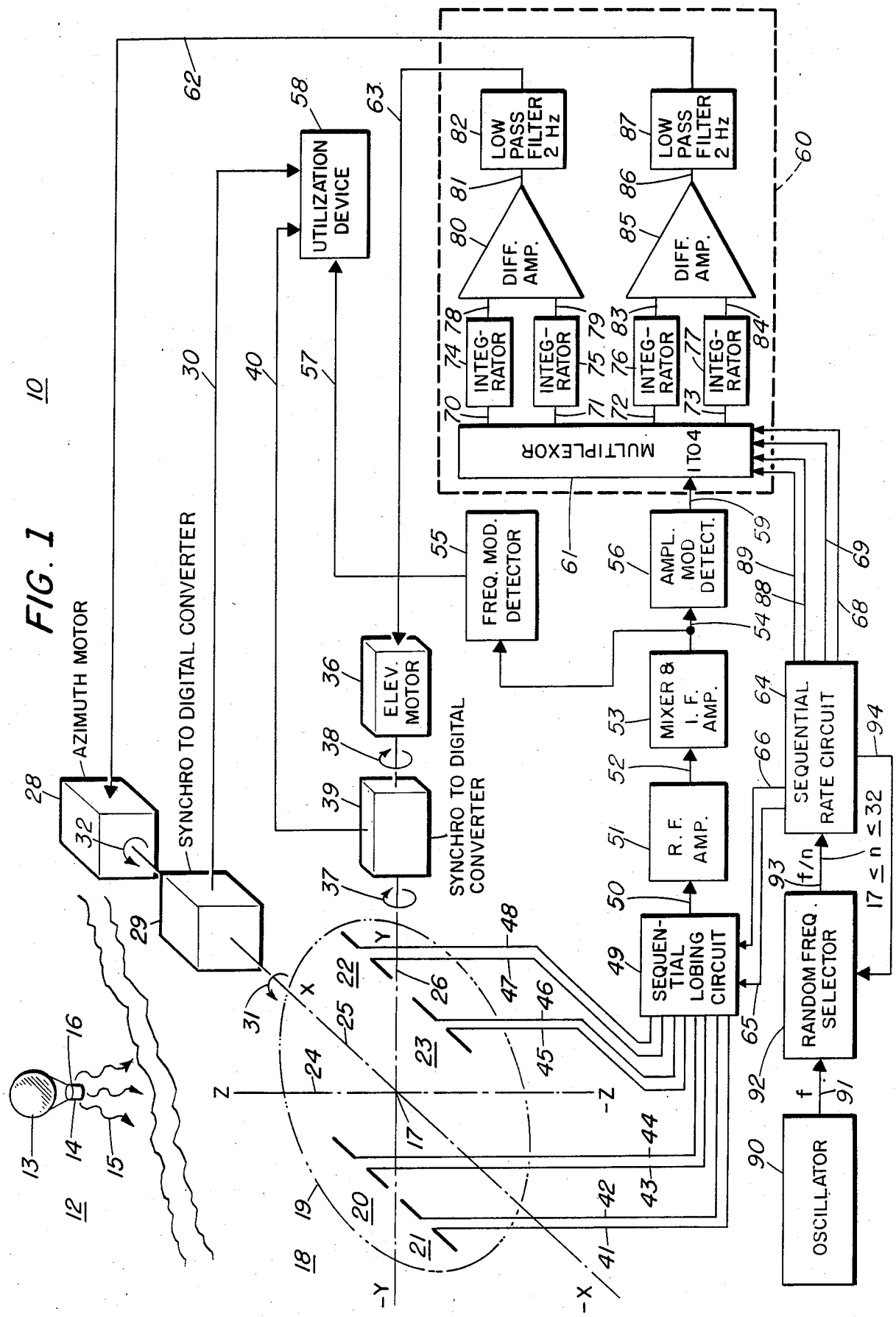
FIG. 1 is a schematic diagram of one embodiment of the invention.

Referring to FIG. 1, a sequential mono-lobe tracker 10 is shown for tracking a radiosonde 12 to determine its position over time and to simultaneously receive data indicative of the atmospheric pressure, humidity and temperature. In FIG. 1, radiosonde 12 includes a balloon 13 for lifting the radiosonde into the atmosphere and a transmitter 14 for emitting radio signals indicative of the meteorological data which is sensed by sensor 16. Transmitter 14 emits radio waves or microwave signals shown by arrows 15 towards the earth. Radio signals emitted by transmitter 14 may, for example, be 1680 MHz with a frequency shift of 150 KHz to carry the data. Sequential mono-lobe tracker 10 may be positioned on the earth or at a suitable location for intercepting radio signals 15 from radiosonde 12 and tracking its position.

An antenna 18 suitable for performing sequential lobing may, for example, comprise a parabolic reflector 19 having a diameter such as 6.5 feet and a focal point 17. Spaced about focal point 17 are four dipole antennas 20-23, one in each 90° quadrant about the focal point. Parabolic reflector 19 is supported by gimbals to permit movement by motors 28 and 36. Dipole antennas 20-23 are mechanically supported by a suitable means to reflector 19 to provide a rigid structure. The arrangement of dipole antennas 20-23 about focal point 17 of parabolic reflector provides a boresight reference line 24 corresponding to the z axis. In the plane of dipole antennas 20-23 and orthogonal to the boresight or z axis 24 are axes 25 and 26 representative of the x and y direction which are orthogonal to one another. Azimuth motor 28 is mechanically coupled along x axis 25 to antenna 18 to enable azimuth motor 28 to rotate antenna 18 about x axis 25. Synchro to digital converter 29 is positioned on the x axis 25 and coupled to antenna 18 to determine the angular displacement of antenna 18 with respect to an initial reference position. Synchro to digital converter 29 has an output over line 30 and functions to provide a signal indicative of the azimuth, the angular displacement about x axis 25. Arrows 31 and 32 indicate the rotation of antenna 18 about x axis 25 provided by azimuth motor 28.

Elevation motor 36 is mechanically coupled along axis 26 to antenna 18 to enable elevation motor 36 to rotate antenna 18 about axis 26 as shown by arrows 37 and 38. Synchro to digital converter 39 functions to detect the angular displacement of antenna 18 about y axis 26, the elevation, with reference to a predetermined position. The output of synchro to digital converter 39 is coupled over line 40 to utilization device 58. The output of dipole antennas 20-23 are coupled over lines 41 and 42, 43 and 44, 45 and 46 and 47 and 48, respectively to sequential lobing circuit 49.

Sequential lobing circuit 49 functions to combine the dipole antenna signals with an appropriate phase shift to provide the sum signal, delta azimuth signal and delta elevation signal for four boresight directions of x, y, −x and −y along the z axis. Sequential lobing circuit 49 may, for example, be a monopulse circuit which is well known in the art to provide monopulse sequential scanning or lobing. Sequential lobing circuit 49, for example, may include a phase shifter and microwave coupler circuits interconnected to provide the sum and delta signals which are well known in the art. The output of sequential lobing circuit 49 is coupled over line 50 to an input of radio frequency amplifier 51. Sequential lobing circuit 49 is responsive to signals over lines 65 and 66 from sequential rate circuit 64 to control the duration of the sum and difference patterns in each of the four directions about z axis 24. Sequential rate circuit 64 may control the scan sequence about z axis 24 in a predetermined manner such as off z axis in the x, y, −x and −y direction for each scan cycle.

Radio frequency amplifier 51 functions to amplify the received signals which may, for example, be a frequency modulated signal and to couple the amplified signal over line 52 to mixer and intermediate frequency amplifier 53. Mixer and intermediate frequency amplifier 53 functions to convert the frequency of the radio signals to a lower frequency and to amplify the signals prior to coupling the radio signals over line 54 to an input of frequency modulation detector 55 and an input of amplitude modulation detector 56.

Frequency modulation detector 55 functions to demodulate the radio signals to data signals. The output of frequency modulator detector 55 is coupled over line 57 to an input of utilization device 58.

Amplitude modulator detector 56 functions to detect the amplitude of the radio signals on line 54 and to provide an output signal over line 59 to an input of error signal generator 60 and more particularly to an input of multiplexer 61. Error signal generator 60 functions to provide an error signal over line 62 to azimuth motor 28 and over line 63 to elevation motor 36.

Sequential rate circuit 64 has output signals coupled over lines 68, 69, 88 and 89 to an input of error signal generator 60 and more particularly to an input of multiplexer 61. Sequential rate circuit 64 functions to provide signals on lines 68, 69, 88 and 89 to couple the input of multiplexer 61 to one of lines 70-73. Lines 70-73 are coupled to an input of integrators 74-77, respectively. Integrators 74-77 function to hold an error voltage on the integrator subject to modification by its input signal. The integrator may, for example, include a resistor in series with a capacitor coupled to ground where the resistor may be 13.3K ohms and the capacitor 0.047 microfarads to provide an RC time constant of 625 microseconds. The voltage across the capacitor is isolated by an amplifier to provide an isolated output signal. Integrators 74 and 75 are coupled over lines 78 and 79, respectively, to respective inputs of differential amplifier 80. Differential amplifier 80 functions to take the difference of the voltage on lines 78 and 79 to provide an output on line 81 to an input of low pass filter 82. Low pass filter 82 may, for example, have a bandpass from 0 to 2 Hz. The output of low pass filter 82 is coupled over line 63. The outputs of integrators 76 and 77 are coupled over lines 83 and 84, respectively, to respective inputs of differential amplifier 85. Differential amplifier 85 functions to take the difference of the voltage on lines 83 and 84 to provide an output of differential amplifier 85 on line 86. Line 86 is coupled to an input of low pass filter 87 which may, for example, have a bandpass from 0 to 2 Hz. The output of low pass filter 87 is coupled over line 62.

Oscillator 90 which may, for example, have a frequency of 218.6 KHz is coupled over line 91 to an input of random frequency selector 92. Random frequency selector 92 functions to randomly select one of a number of predetermined frequencies. The output of random frequency selector 92 is coupled over line 93 to an input of sequential rate circuit 64. The frequency signal on line 93 is the frequency selected from a number of predetermined frequencies. It is used for controlling the frequency or timing of sequential rate circuit 64. After sequential rate circuit 64 has cycled through a sequence of boresight positions or lobing. A reset signal is coupled over line 94 to an input of random frequency selector 92. The reset signal functions to reset random frequency selector 92 to provide a new frequency which is obtained by randomly selecting one of sixteen predetermined frequencies.

In operation, sequential lobing circuit 49 sequences the boresight of antenna 18 through four positions every scan cycle. The scan cycle frequency is in the range from 854 Hz to 1.61 KHz. The dwell time in each of the four boresight positions is one fourth of the time for one scan cycle which corresponds to a dwell time in the range from 155 us. to 293 us. for the above range of scan cycle frequencies. In the embodiment shown in FIG. 1, each scan cycle frequency has a duration of one cycle prior to a new scan cycle frequency which is initiated by the reset signal on line 94. The scan cycle frequency is randomly selected from one of sixteen frequencies in the above range from 854 Hz to 1.61 KHz.

In one embodiment of sequential lobing circuit 49, the frequencies of the control signals on lines 65 and 66 are at the scan cycle frequency and at twice the scan cycle frequency, respectively. One of four antenna boresight positions is defined by the relative phase relationship of the control signals. Thus, to provide a scan cycle in the range from 854 Hz to 1.61 KHz with each scan cycle sequencing through four antenna boresight positions, the frequency of the control signals on line 65 is in the range from 854 Hz to 1.61 KHz, and on line 66 in the range from 1.7 KHz to 3.22 KHz.

As the antenna boresight position is moved under the control of sequential rate circuit 64, multiplexor 61 couples the amplitude signal on line 59 corresponding to a boresight position of antenna 18 to a corresponding integrator 74-77. For example, when the boresight or off boresight position is in the x direction, the amplitude signal on line 59 may be coupled to integrator 74 by multiplexor 61. When the boresight is positioned in the −y direction, the amplitude signal on line 59 may be coupled to integrator 77 by multiplexor 61. In other words, integrators 74 and 77 each integrate amplitude signals corresponding to a respective boresight position. Amplitude modulation detector 56 provides an output signal indicative of the amplitude, power or energy of the received signal with respect to the present antenna boresight position. Thus, if antenna 18 is directed to a target closer to one boresight position than the other, then the two boresight positions will have a different amplitude signal on line 59. Integrators 74-77, therefore, represent the integrated amplitude of the radio signals received as a function of the boresight position. The difference in the integrators provides an error signal which may be used to drive motors 28 and 36 to move antenna 18, such that the amplitude signals such as in the x and −x boresight direction may be equal and the amplitude signals in the y and −y boresight direction may be equal.

Prior to each scan cycle or sequence of monopulse lobing, a frequency, one of sixteen frequencies, is selected at random. Thus, after every scan cycle of positioning the antenna boresight through four positions, a new boresight switching frequency is selected. By changing the frequency by randomly selecting a frequency at which sequential mono-pulse lobing circuit completes a scan cycle through four boresight positions, the modulated data contained in the radio signals received from radiosonde 12 is prevented from interfering with the amplitude measurements of the radio signal stored in integrators 74-77.

By randomly selecting one out of a possible sixteen frequencies from 854 Hz to 1.61 KHz for each successive sequential monopulse lobing cycle, periodic interfering meteorological data signals appear as random noise with regard to integrators 74-77. Integrators 74-77, therefore, have substantially no direct current or voltage output at the difference amplifiers due to the periodic meteorological data signals.

Furthermore, sequential lobing circuit 49 may be switched from each boresight position after a random time period or dwell time to reject interfering periodic signals instead of after each scan cycle. However, more noise may be produced by difference amplifiers 80 and 85, lines 62 and 63, since common mode rejection utilizing equal time periods for each antenna position would be reduced.

Figure 2:
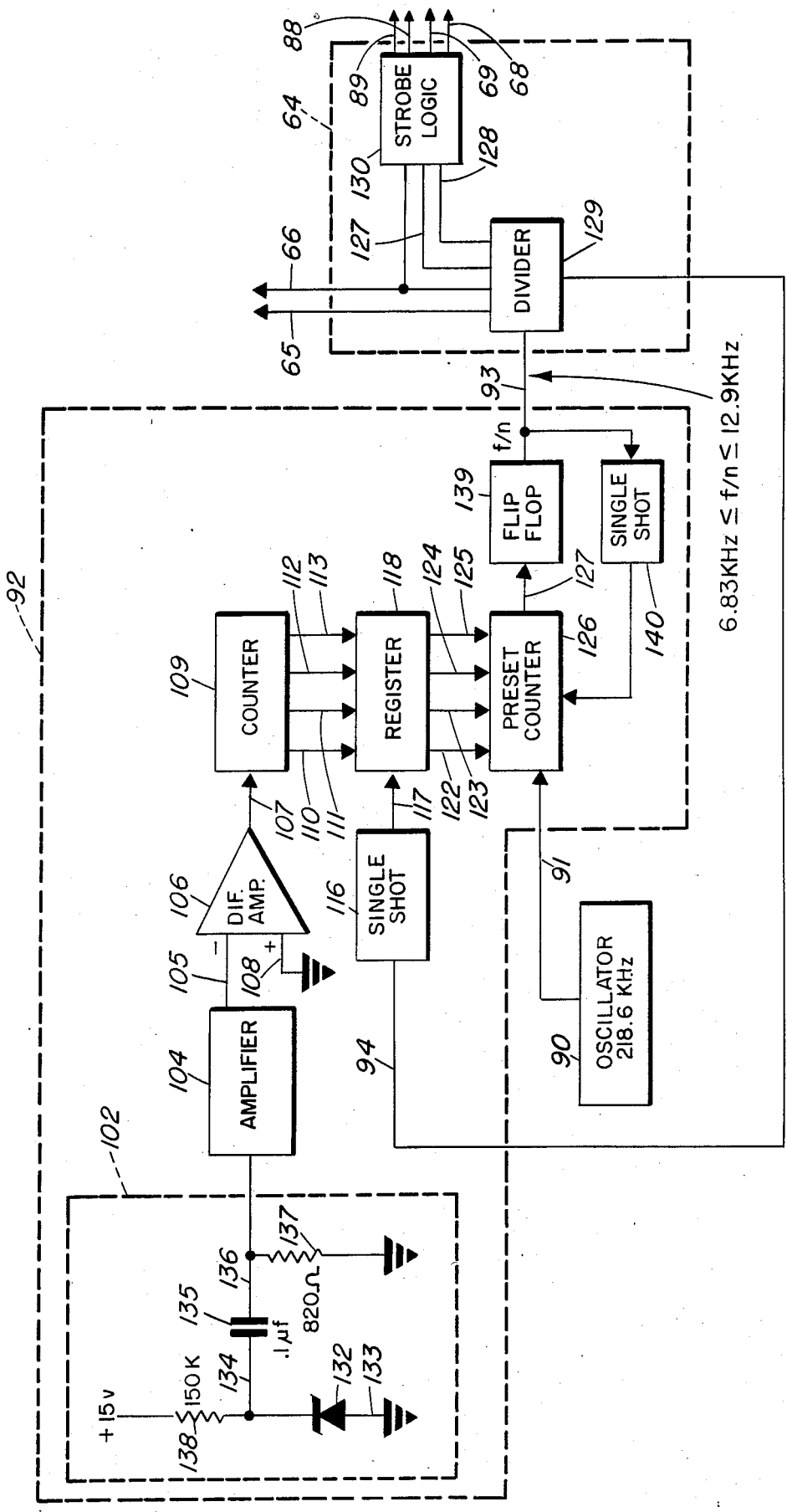
FIG. 2 is a schematic diagram of one embodiment of an oscillator 90, random frequency selector 92 and sequential rate circuit 64 shown in FIG. 1.

FIG. 2 is a schematic diagram of one embodiment of an oscillator 90, random frequency selector 92 and sequential rate circuit 64. In FIG. 2 like references are used for functions corresponding to the apparatus of FIG. 1. In FIG. 2 a gaussian random noise generator 102 provides a noise signal in the form of a voltage which is amplified by amplifier 104. Amplifier 104 may, for example, be four cascaded amplifiers having a total gain of 20,000. The output of amplifier 104 is coupled over line 105 to an input of voltage comparator 106 which may be, for example, a differential amplifier. Voltage comparator 106 functions to compare the voltage signal on line 105 with respect to a reference signal such as ground potential the output of comparator 106 on line 107 is a digital signal having a "one" for voltages above the reference voltage on and a "zero" for voltages below the reference voltage. The output of voltage comparator 106 is a digital signal containing random pulses. A counter 109 which may, for example, have four stages counts the random pulses and provides an output of each stage on lines 110-113. A reset signal on line 94 is coupled to an input of single shot 116 which provides an appropriate time delay before generating a pulse on line 117 to the latch input of register 118. In response to the pulse on line 117, register 118 stores the signals on lines 110-113 at the time of the trailing edge of the pulse on line 117. Register 118 has four output lines 122-125 which are coupled to the input ports of a preset counter 126.

Preset counter 126 functions to count down to zero from the number coupled to its input ports. The frequency signal on line 91 is coupled to the clock input of preset counter 126. Upon reaching a count of 0000, preset counter 126 resets to a count of 1111. The terminal count output of preset counter 126 occurring at count 0000 is coupled over line 127 to the complementing input of flip flop 139. At the clock pulse following the 0000 state, terminal count signal on line 127 goes to zero causing flip flop 139 to change state. If flip flop 139 changes from 0 to 1 on line 93, then single shot 140 is triggered and a random number from 0 to 15 stored in register 118 is loaded into preset counter 126. However, if flip flop 139 changes from 1 to 0, then single shot 140 is not triggered and preset counter 126 will count down from 1111 to 0000, causing another terminal count signal. Following this terminal count, flip flop 139 goes from zero to one, triggering single shot 140 which reloads preset counter 126 with the number stored in register 118. Preset counter 126, register 118, and flip flop 139 have the effect of providing a random number and integer n in the range from 17-32 for dividing the frequency of oscillator 90.

If the frequency on line 91 is 218.6 KHz then, depending on the value of integer n, the output frequency will be in the range from 6.83 KHz to 12.9 KHz in discrete increments according to f/n, where f is the frequency. The output of flip flop 139 is coupled over line 93 to an input of divider 129 which further divides the frequency on line 93 to provide an ouptut signal on line 65 having a frequency in the range from 854 Hz through 1.61 KHz in discrete increments according to the formula f/8n, where n is an integer having a value in the range from 17-32.

Divider 129 of sequential rate circuit 64 also provides frequencies on lines 128, 127 and 66 of f/n, f/2n and f/4n, respectively. The above frequencies are coupled over lines 128, 127 and 66 to strobe logic 130. Strobe logic 130 provides strobe pulses on lines 68, 69, 88 and 89 during the dwell times corresponding to the four antenna positions of sequential lobing circuit 49 to couple the amplitude on line 59 to a corresponding integrator 70-73. Divider 129 also provides a reset signal at a frequency such as f/8n on line 94.

Gaussian random noise generator 102 may include a diode manufactured to provide white noise or a gaussian noise output at a minimum of 0.7 uv./$\sqrt{Hz}$. One example of diode 132 suitable for providing gaussian random noise is part no. CND-6003A manufactured by Standard Reference Labs., Inc., Coan Place, Metuchen, N.J. 08840. As shown in FIG. 2, the anode of diode 132 is coupled over line 133 to ground potential. The cathode of diode 132 is coupled over line 134 through capacitor 135 over line 136 to an input of amplifier 104. Line 136 is also coupled through resistor 137 which may have a value, for example, of 820 ohms to ground potential. Line 134 is also coupled through resistor 138 to voltage source for supplying current through diode 132. Resistor 138 may be, for example, 150K ohms and the voltage source may be, for example, +15 v.

In operation, random frequency selector 92, receives a reset pulse on line 94 causing a new random number n to be stored in register 118. Counter 109 is free running and continually increments in response to random pulses at the output of voltage comparator 106. Register 118 provides a random number which may be an integer in the range from 0-15 to preset counter 126. Preset counter 126 and flip flop 139 function to divide the frequency on line 91 by the above random number plus 17 to form a new random number n in the range from 17 to 32. Thus, every time a reset pulse on line 94 is received by random frequency selector 92, a frequency is selected at random. The frequency selected is f/n, where f is the frequency on line 91 and n is the random number 17 to 32.

The format of modulated radio signals 15 from radiosonde 12 are given in Table I for pressure, temperature, humidity and a reference. The pulsewidth of the radio signal indicates the particular parameter being measured and the frequency of the recurring pulse is an indication of the value of the parameter. The parameters are cycled through in a predetermined sequence. One such sequence may be, for example, pressure, temperature, pressure, humidity, pressure, temperature, pressure, reference, which is then repeated indefinitely. Each parameter may be transmitted, for example, for one second. The signal format is impressed upon the 1680 MHz carrier by a frequency shift of 150 KHz.

TABLE I

| Parameter | Pulsewidth (us.) | Parameter Value Range in Pulse Repetition Frequency (PRF) (Hz) |
| --- | --- | --- |
| Pressure | 1350 | 265-410 |
| Temperature | 936 | 25-400 |
| Humidity | 650 | 25-400 |
| Reference | 450 | 475 |

Figure 3:
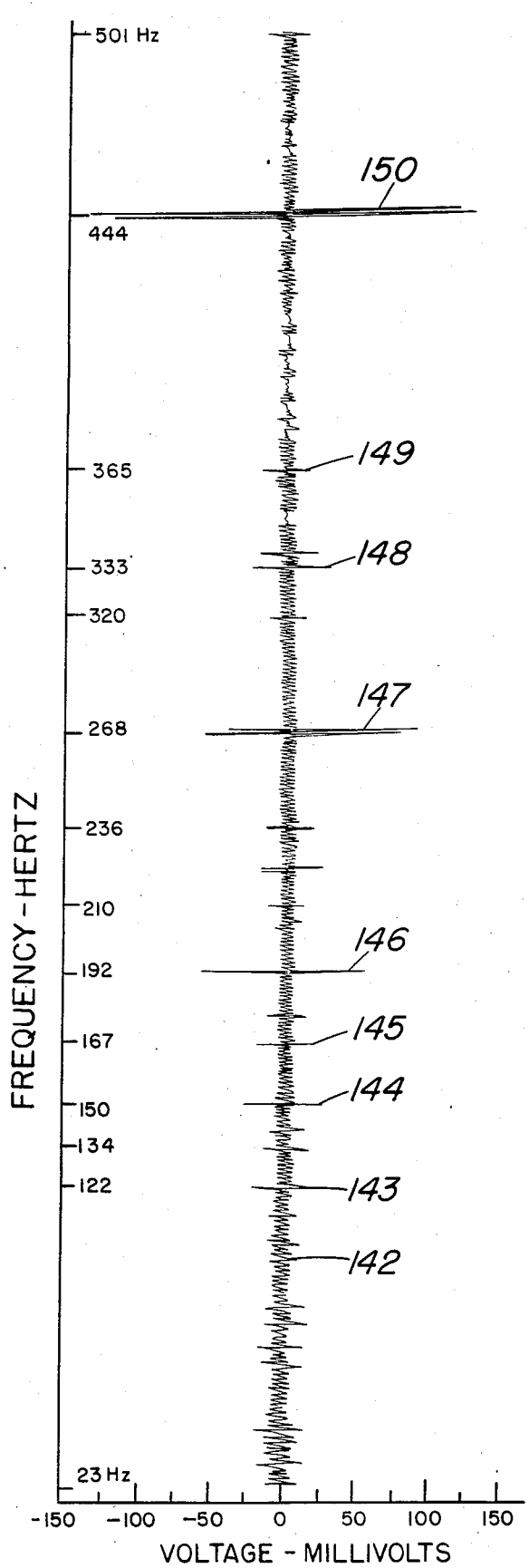
FIG. 3 is a graph showing the tracking performance of a prior art tracker.

Referring to FIG. 3, the tracking performance of a prior art tracker is shown. In FIG. 3 the ordinant represents the data frequency in hertz and the abscissa represents error voltage in millivolts. For the test data in FIG. 3 a radiosonde such as radiosonde 12 shown in FIG. 1 was suspended from a tower and held stationary. A frequency generator located on the ground provided a signal over a wire to the radiosonde consisting of data pulses at a 50% duty cycle. The frequency generator was swept over a frequency range from 23 Hz to 502 Hz in approximately 21 minutes time. The radiosonde emitted corresponding frequency modulated signals of a carrier at 1680 MHz. A tracker, having the boresight of its antenna directed at the radiosonde, received the radio frequency modulated signals and at the same time tracked the radiosonde which was stationary by sequentially lobing or scanning at the fixed frequency of 1333 Hz curve 142 of FIG. 3 shows the elevation tracking error voltage developed by the tracker. The antenna of the tracker was observed to move in response to the error signal as it should even though the radiosonde was stationary.

Peak elevation tracking error voltage was observed at curve portions 143-150 corresponding to times when the frequency modulated data pulse frequency was 122, 150, 167, 192, 268, 333, 365 and 444 Hz. The elevation tracking error voltage varied from approximately 15 mv on curve portion 145 to −135 mv at curve portion 150. The tracker was of a similar configuration to FIG. 1 except that random frequency selector 92 was deleted and a fixed frequency of 1333 Hz was provided to sequential lobing circuit 64 over line 93.

Figure 4:
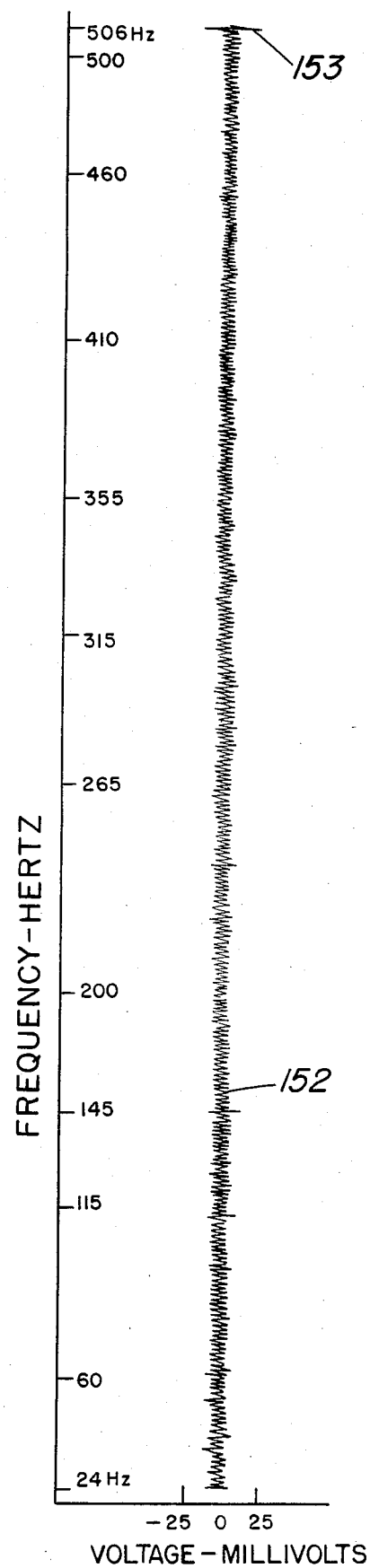
FIG. 4 is a graph showing the tracking performance of the embodiment in FIG. 1.

FIG. 4 is a graph showing the tracking performance of the embodiment in FIG. 1. In FIG. 4 the ordinate represents the data frequency in hertz and abscissa represents error voltage in millivolts. For the test data in FIG. 4, a radiosonde 12 was suspended from a tower and a tracker as shown in FIG. 1 was directed towards radiosonde 12. A wire from a frequency generator on the ground provided a data signal to radiosonde 12. The frequency generator provided a 50% duty cycle. The frequency generator was swept over a frequency range from 23 Hz to 508 Hz over 21 minutes. Curve 152 shows the elevation tracking error voltage on line 63 as the data signal received by tracker 10 was varied from 23 to 508 Hz. Typical elevation tracking error voltage was from 0 to 7.5 mv. A 7.5 mv elevation tracking error voltage corresponds to an antenna off boresight elevation of 0.55°. As may be seen in FIG. 4 at curve portion 153 an error voltage of 17.5 mv was developed corresponding to a data frequency of 506 Hz. In FIG. 3 curve portion 147 corresponds to a tracking error of 4°. Likewise, at curve portion 150 the tracking error voltage corresponded to a tracking error of 10°. FIG. 4 shows an improvement in the elevation tracking error voltage for tracking a stationary radiosonde where the radiosonde emits a frequency modulated signal where the data varies in pulse repetition frequency in the range from 23 Hz to 508 Hz.

The invention provides an apparatus and method for tracking a target which is emitting radio signals comprising an antenna having a boresight for receiving and tracking radio signals, means for shifting the boresight of the antenna from a first to a second position and back a plurality of times, the frequency of shifting from the first position to the second position and back determined by randomly selecting one of a plurality of predetermined frequencies, means for developing an amplitude signal indicative of the power of the radio signals received in the first and second positions, means for generating an error tracking signal in response to the amplitude signals and means for positioning the antenna in response to the error signal.

A random number generator is described comprising a diode exhibiting a white or gaussian noise when current is passed through it. Means for amplifying the voltage across the diode, a voltage comparator for comparing the voltage across the diode with a reference voltage to provide a plurality of pulses at the output of the voltage comparator, and a counter responsive to the output of the voltage comparator for incrementing the counter upon the trailing edge of each pulse.

The invention claimed is:

1. A method for passively tracking a target emitting periodic amplitude modulated radio signals without induced tracking errors from said radio signals comprising the steps of non-periodic antenna scanning by shifting the boresight of an antenna from a first to a second position and back at each of a sequence of frequencies, developing amplitude signals indicative of the power of the radio signals received in the first and second positions, generating an error signal in response to the amplitude signals, and positioning the antenna in response to said error signal, said step of non-periodic antenna scanning includes the step of randomly selecting said sequence of frequencies from a plurality of predetermined frequencies whereby the dwell time of said boresight in each respective position is non-periodic.

2. Apparatus for passively tracking a target emitting periodic amplitude modulated radio signals without induced tracking errors from said radio signals comprising:
   an antenna having a boresight for receiving radio signals,
   means for non-periodic antenna scanning by electrically shifting said boresight of said antenna from a first to a second position and back at each of a sequence of frequencies,
   mean for developing first and second amplitude signals indicative of the power of said ratio signals received in said first and second positions respectively,
   means for generating an error signal in response to said first and second amplitude signals, and
   means for mechanically positioning said antenna in response to said error signal,
   said means for non-periodic antenna scanning includes means for randomly selecting said sequence of frequencies from a plurality of predetermined frequencies whereby the dwell time of said boresight in each respective position is non-periodic.

3. The apparatus of claim 2 wherein each said frequency occurs for a predetermined number of cycles.

4. The apparatus of claim 2 further including a low pass filter coupled to said error signal to provide a filtered error signal and wherein each said frequency occurs for a time interval less than a time for generating said filtered error signal.

5. Apparatus for passively tracking a target emitting periodic amplitude modulated radio signals without induced tracking errors from said radio signals comprising:
   an antenna having a boresight for receiving radio signals,
   means for non-periodic antenna canning by shifting said boresight of said antenna from a first to a second position and back at each of a sequence of frequencies,
   means for developing first and second amplitude signals indicative of the power of said radio signals received in said first and second positions respectively,
   means for generating an error signal in response to said first and second amplitude signals, and
   means for positioning said antenna in response to said error signal,
   said means for non-periodic antenna scanning including means for randomly selecting said sequence of frequencies from a plurality of predetermined frequencies, wherein said means for randomly selecting includes a random number generator.

6. The apparatus of claim 5 wherein said random number generator includes a gaussian voltage noise source coupled to an amplitifer, a voltage comparator coupled to the output of said amplifier for generating random pulses, and a counter responsive to said random pulses for incrementing said counter wherein a random number is provided by the output stages of said counter.

7. Apparatus for passively tracking a target emitting periodic amplitude modulated radio signals without induced tracking errors from said radio signal comprising:
   an antenna having a boresight for receiving radio signals,
   means for non-periodic antenna scanning by shifting said boresight of said antenna from a first to a second position and back at each of a sequence of frequencies,
   means for developing first and second amplitude signals indicative of the power of said radio signals received in said first and second positions respectively,
   means for generating an error signal in response to said first and second amplitude signals, and
   means for positioning said antenna in response to said error signal,
   said means for non-periodic antenna scanning including means for randomly selecting said sequence of frequencies from a plurality of predetermined frequencies, wherein said means for randomly selecting includes a divider adapted for receiving a frequency signal, said divider adapted for receiving a random number, said divider operative to divide said frequency signal by said random number.

8. Apparatus for passively tracking a target emitting periodic amplitude modulated radio signals without induced tracking errors from said radio signals comprising:
   an antenna having a boresight for receiving radio signals, means for non-periodic antenna scanning by shifting said boresight of said antenna from a first to a second position and back at each of a sequence of frequencies, means for developing first and second amplitude signals indicative of the power of said radio signals received in said first and second positions respectively, means for generting an error signal in response to said first and second amplitude signals, and means for positioning said antenna in response to said error signal, said means for non-periodic antenna scanning including means for randomly selecting said sequence of frequencies from a plurality of predetermined frequencies, wherein said means for randomly selecting includes a register for storing a random number and a divider for dividing a frequency by the random number in said register.

9. Apparatus for passively tracking a target emitting periodic amplitude modulated radio signals without induced tracking errors from said radio signals comprising:

an antenna having a boresight for receiving radio signals, means for non-periodic antenna scanning by shifting said boresight of said antenna from a first to a second position and back at each of a sequence of frequencies, means for developing first and second amplitude signals indicative of the power of said radio signals received in said first and second positions respectively, means for generating an error signal in response to said first and second amplitude signals, and means for positioning said antenna in response to said error signal, said means for non-periodic antenna scanning including means for randomly selecting said sequence of frequencies from a plurality of predetermined frequencies, wherein said means for randomly selecting includes randomly selecting a frequency to provide a time interval for said antenna at said first boresight position and for randomly selecting a frequency to provide a second time interval for said antenna at said second boresight position.

* * * * *